Patented Oct. 30, 1951

2,573,616

UNITED STATES PATENT OFFICE 2,573,616

METHODS OF EXTRACTING MAGNESIA FROM AQUEOUS SOLUTION CONTAINING MAGNESIUM SALTS DECOMPOSABLE BY LIME AND ALKALIES

Jean Charles Séailles, Paris, France

No Drawing. Application August 5, 1947, Serial No. 766,471. In France December 3, 1939

Section 1, Public Law 690, August 8, 1946
Patent expires December 3, 1959

5 Claims. (Cl. 23—201)

My present invention has for its object to provide a method for extracting magnesia from aqueous solutions containing magnesium salts adapted to be decomposed by lime into magnesium hydroxide and soluble calcium salts. As examples of such solutions, the most noteworthy are sea-water, mother-liquor from salterns and in general the natural or artificial solutions of magnesium salts decomposable by lime or alkalis.

The reaction used for instance in the case of sea-water is of the following type:

(1) 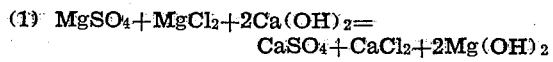
$$MgSO_4 + MgCl_2 + 2Ca(OH)_2 = CaSO_4 + CaCl_2 + 2Mg(OH)_2$$

Preferably and for considerations of cost, lime is generally used. The source of said lime may either be caustic lime, or a substance containing lime in admixture with magnesia, as for instance calcined dolomite.

Unfortunately the reaction (1) normally leads to the formation of very voluminous precipitates of magnesia which are very difficult if not impossible to wash and filter and which by reason of their more or less colloidal character retain excessive amounts of water.

The result is that magnesia when thus prepared is expensive and requires the use of a very large and costly plant.

To overcome the above difficulty, it has been suggested to convert magnesia prior to its recovery into carbonate of magnesia, but it is then necessary to resort to a costly carbonating procedure and moreover the carbonate recovered in this way requires an additional decarbonating step, which superfluously consumes a considerable amount of heat.

The method according to my invention consists of precipitating the magnesia under specific conditions whereby the product recovered, rather than being in the form of lightweight and more or less colloidal precipitates, is a compact material, settling readily, and easy to wash, filter and dry.

The procedure used for that purpose essentially consists of mixing the magnesium salt solution with the reactant lime, separating the precipitate formed and reintroducing and agitating the precipitate from the first operation into a fresh amount of magnesium salt solution during the reaction which corresponds to a second operation, and so on, for a number of successive operations until the point where a final precipitate is obtained representing the total amount of magnesia precipitated in the course of the successive operations, but which offers an apparent specific gravity and a capacity for settling, washing, filtering and drying which may be adjusted at will, according to the number of cumulative operations which it may be desired to use.

As just stated, the initial precipitate may be the product of the treatment itself. But it could also be constituted by hydrated magnesia from a different source in sufficient amount to form in the reactant mixture a milk of magnesia in the presence of which the reaction will occur at the time when the mixture which is to bring about a further precipitation is effected.

Practically, rather than operating as above in successive and discontinuous batch operations, the invention is carried out continuously, by combining together:

(a) A reaction vessel or tank provided with efficient agitating means into which the magnesium solution and the reactive lime are regularly delivered;

(b) A suitable separator for removing the precipitate formed from the exhausted solution;

(c) An appropriate device for recycling the precipitate as separated in b into the reaction vessel.

Part of the liquor discharged in a may desirably be recycled into the reaction vessel prior to the separation (or prior to complete separation) of the precipitate which in this way is partly recycled back without being preliminarily separated.

After the system has been operated for a sufficient period of time and the precipitate shows the required properties of specific gravity, washability and the like, it is possible either to recover the total amount of precipitate and begin the cycle all over again, or preferably, regularly remove from the separator b a fraction of the precipitate while the remainder is sent back to the reaction vessel.

In the latter instance, a continuous cyclic process is realised, once stable operating conditions have been reached.

By way of example, while the precipitate from the first operation occupies a large volume, the procedure used is operative to yield, at the end of as little as twenty successive operations, a final precipitate the total apparent volume of which is four times smaller than that of the initial precipitate and which nevertheless contains twenty times more material, so that in this case the contraction is eighty times greater after the twentieth operation than after the first.

In continuously operating plants, precipitates may readily be obtained which, in stable operations have an apparent specific gravity exceeding when in the state of raw sludges from the settling tank, a value of 1.2 and in the state of filter cakes, 1.4, and those figures are purely representative values and are in no way to be taken as upper limits.

In order to derive maximum benefit from the invention, it is desirable to maintain in a suitable state of suspension through appropriate agitation the precipitate recycled during the reaction, and introduce the precipitate into one at least of the liquids which are to be reacted so as to ensure that it is properly dispersed even before the reaction has been initiated.

The magnesian solution used may, as stated above, be natural or artificial brines; however, if required by the purity of the grade of magnesia which it is desired to obtain, it may be necessary to subject the solutions to a preliminary purifying treatment. In general the major contaminant results from the presence of $CO_2$ either free or in combined form in the solutions. The latter may then be purified either by an alkaline process by adding to the solution, the amount of lime necessary to fix the $CO_2$ as carbonate of lime which precipitates, or by an acidic process involving the destruction, by a suitable addition of acid (such as hydrochloric acid), of the carbonates and bicarbonates therein, and then stripping the solution of the dissolved $CO_2$ retained therein, for instance by treatment in vacuo or by suitably bubbling air therethrough.

The magnesia may also be purified after precipitation by proceeding as follows:

The magnesia containing lime carbonate as a contaminant is calcined then washed with water which dissolves the CaO formed.

Moreover it has been found that, depending on the desired degree of purity in the final product, it may be possible to use lime either in a dissolved condition or as a paste, or as a milk, or in the form of calcined dolomite.

If a grade of maximum purity is desired, the most satisfactory reagent will be lime-water. Lime-water has the advantage of practically constituting a pure reagent because all of the impurities in calcined limestone are generally insoluble in lime water and, when they are soluble, they are not subsequently precipitated during the operations. I have found that in spite of the fact that lime-water is a very dilute reagent, its use does not incur high expenditure because the cost of pumping and handling the lime-water only involves low consumption of power, this being all the more true since I have found that lime-water may be obtained without any inconvenience by the use of the exhausted lyes derived from the reaction itself.

Moreover, the use of lime-water makes it possible to use comparatively impure limestone and thereby enjoy great freedom in the location or layout of the plants. Finally, since the compact precipitates produced according to the invention are rapidly and easily settled, the capacity of the settling tanks remains within reasonable limits as compared to the capacity of settling tanks required by the colloidal precipitates obtained conventionally.

In general, for the reaction using lime-water or any of the other reagents to be described hereinafter, it is preferable to mix the recycled precipitate with the lime-water or the reagent and adjust the proportions so as to operate with a slight excess of magnesium salt solution, this providing the advantage of avoiding any loss in lime which generally is a more expensive product than the solution.

If a high grade of purity is desired, it may be of interest to operate in conditions such as to be sheltered from $CO_2$, and such result may be obtained for instance by maintaining a film of oil over the surface of the liquid contained in the tank and the settling devices.

When the obtention of a very pure grade of magnesium hydroxide is not contemplated it will be found simpler to operate with milks of lime or milks of calcined dolomite. In this case there is the drawback that a part of the impurities in the lime or the calcined dolomite is retained in the magnesia, but on the other hand, the volumes to be handled are greatly reduced and in this case also when operating according to my method, dense precipitates will be obtained which are easy to settle, filter, wash and calcine.

In this form of embodiment of my invention, the procedure will preferably be carried out as follow:

I. First prepare a milk of the reagent (for instance lime or calcined dolomite). During this step, the bulk of the contaminants (uncooked and overcooked portions, etc.) are easily eliminated.

II. Dilute the milk to convert it into a suspension of solid particles in a diluting liquid (water or exhausted lye). During this step a further fraction of the contaminants may be removed.

III. Mix and react the suspension II with the magnesium solution in the presence of a previously formed magnesia precipitate systematically recycled back, in accordance with the method already described for obtaining compact precipitates which are easy to settle, filter and wash according to the invention.

IV. Separate the mother liquors from the precipitate which is recycled to III until it has acquired the desired properties.

The diluting step II could possibly be reduced or suppressed. It is of course possible to operate in this case, just as with lime-water, in a batch or in a continuous process.

The water used for the preparation of the milk and for diluting could either be fresh water, or exhausted lye, but it is still more desirable to use, as a diluting liquid, a portion of the reactive liquid from operation III still retaining the precipitate formed in the reaction. In operating in this manner I avoid introducing into the cycle a fresh amount of liquid, the operations are simplified and a portion of the precipitates is recycled back prior to settling in an econmical manner.

Separation of the impurities in II may for instance be effected by screening or by any equivalent means.

Separation of the impurities in II may for instance be effected by a summary settling operation adapted to eliminate the heavier or larger particles.

By way of example I will now describe one practical embodiment of the invention using sea-water and lime-water.

The sea-water is purified as in known practice by the addition of CaO and filtration to remove the $CaCO_3$ formed.

The lime-water is obtained from the exhausted lye from the settling tank; it is decanted but not filtered.

The lime-water is discharged into a reaction vessel which simply comprises a channel provided with baffles to ensure satisfactory agitation therein. The sea-water, in a proportion calculated according to the magnesium salt content of the sea-water (preferably with a slight excess of sea-water) is introduced in equal fractions throughout the length of the channel; at the outlet of the channel a fraction of the effluent is continuously recycled to the upstream end of the channel.

The surplus effluent is received in a settling tank; the precipitate is separated off, taken up by a pump and discharged into the inlet conduit supplying the lime-water.

When stable operating conditions have been reached, a suitable fraction of the precipitate is regularly withdrawn for use and the remainder continues to be recycled back.

The length of the reaction channel and the rate of flow of the liquid are selected so as to ensure that the reaction is practically continuous in the apparatus.

The same type of plant may also be used with lime-water, but in this case it is necessary to use a reaction channel of larger size enabling a longer period of retention, because the reaction in this case is less rapid; for the same reason, it is desirable to provide for more vigourous agitation. By way of indication, for a yield corresponding to one ton of MgO per hour (as $Mg(OH)_2$), when operating with milk of lime, good results have been had with the following combination of operating conditions:

1. Proportion of the reactants: 500 m.$^3$ of seawater (source: the Atlantic Ocean); 1400 kgs. of CaO (plus contaminants and insolubles).
2. Volume of the diluting tank: 500 cubic meters.
3. Volume of the reaction vessel: 150 cubic meters.
4. Surface area of the settling tank: 1000 to 1500 square meters.

Another way of carrying out the invention consists of using tanks provided with agitators arranged serially and through which the products are adapted to flow successively.

In that case, the first tank is caused to receive continuously the reactant milk, the recycled precipitate from the separator and a fraction of the liquid derived from the last tank of the series. All of the above products are then mixed together and progressively passed through the successive tanks into each of which an appropriate amount of the magnesian liquid is added.

The overflow from the last tank is discharged into the separator. After stable conditions have been reached, a fraction of the precipitate is recovered for use.

In this embodiment the proportion of diluting water may be greatly reduced, on condition efficient agitation is provided for and sufficient time is allowed for the reaction to be practically completed in the last tank.

Having now described and ascertained the nature of my said invention and in what manner the same is to be performed, I declare that what I claim is:

1. A process of producing precipitates of hydrated magnesia from solutions containing magnesium salts decomposable by a reagent selected from the group consisting of lime and alkalies which comprises reacting said reagent with said solution, to form a magnesium hydroxide precipitate, maintaining a film of oil over the surface of the solution to protect the latter from carbon dioxide, introducing said precipitate into a further body of said solution and reacting a further amount of said reagent with said solution and so on in a plurality of sequential steps, maintaining substantial agitation in each of said bodies of solution, whereby to obtain a final magnesia precipitate of a character which is easily settlable, easy to wash and to filter.

2. In the method of producing a magnesia precipitate from a solution containing a dissolved bicarbonate of a metal and magnesium salts decomposable by a reagent selected from the group consisting of lime and alkalies, purifying said solution by adding an acid thereto, the acid decomposing said bicarbonate, to form a salt of the acid and carbon dioxide gas, degassing said solution, treating successive amounts of said solution with said reagent and recycling the precipitate formed until a precipitate of substantial particle size is produced.

3. In precipitating magnesium hydroxide by interaction of an aqueous mixture of calcium hydroxide and a dissolved magnesium salt, exposed on the upper surface of the said mixture to the atmosphere, the improvement consisting of maintaining a film of oil over the upper surface of the said aqueous mixture so as to prevent absorption of carbon dioxide from the atmosphere.

4. The method described in claim 2, the said degassing being effected by subjecting the solution after the addition of acid to evacuation.

5. The method described in claim 2, the said degassing being effected by bubbling air through the solution subsequent to the addition of the acid.

JEAN CHARLES SÉAILLES.

REFERENCES CITED

The following references are of record in the file of this patent:

UNITED STATES PATENTS

| Number | Name | Date |
|---|---|---|
| 1,270,589 | Barstow | June 25, 1918 |
| 1,505,202 | Judd | Aug. 19, 1924 |
| 1,689,059 | Show | Oct. 23, 1928 |
| 2,041,047 | Chesny | May 19, 1936 |
| 2,255,422 | Heath et al. | Sept. 9, 1941 |